April 12, 1932.  G. F. SHIELDS  1,853,238
SPONGE HANDLE
Filed Aug. 4, 1930
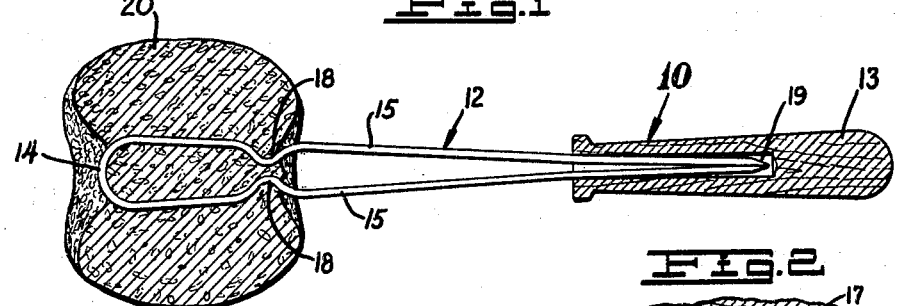
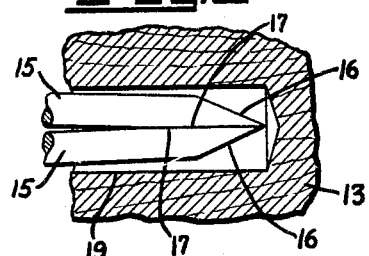
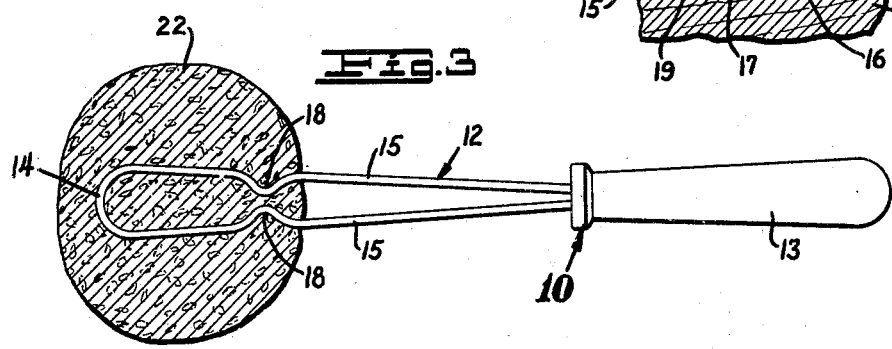
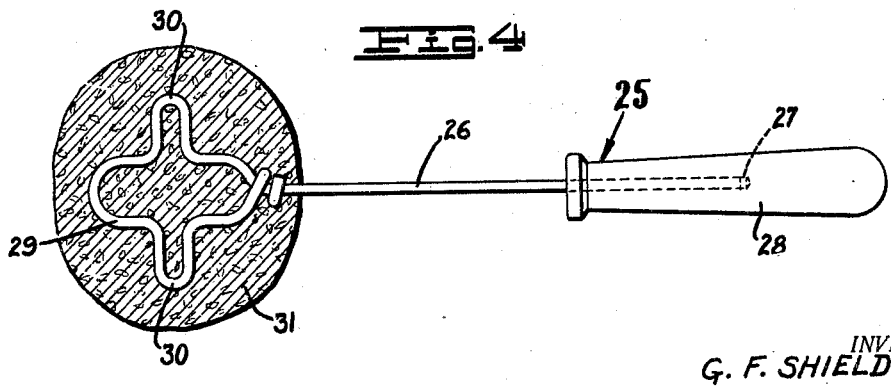
INVENTOR.
G. F. SHIELDS.
BY BJCraig
ATTORNEY.

Patented Apr. 12, 1932

1,853,238

UNITED STATES PATENT OFFICE

GEORGE F. SHIELDS, OF LOS ANGELES, CALIFORNIA, ASSIGNOR OF ONE-HALF TO JAMES P. BERNE, OF LOS ANGELES, CALIFORNIA

SPONGE HANDLE

Application filed August 4, 1930. Serial No. 472,932.

This invention relates to sponge handles or holders.

The general object of the invention is to provide a handle for a sponge whereby the sponge can be manipulated.

Another object of the invention is to provide a sponge handle or holder which may either be inserted through the sponge or molded within a synthetic sponge.

Other objects and the advantages of this invention will be apparent from the following description taken in connection with the accompanying drawings wherein:

Fig. 1 is a central longitudinal section through my improved holder showing a rubber sponge operatively positioned thereon.

Fig. 2 is an enlarged fragmentary section through the handle of the device.

Fig. 3 is a view of my improved handle or holder showing a rubber sponge molded thereon, and Fig. 4 is a view of a modified form of handle showing a rubber sponge molded thereon.

Referring to the drawings by reference characters I have indicated my improved holder or handle generally at 10 and as shown it comprises a shank 12 and a grip 13.

The shank 12 is preferably made of a good grade of flexible steel rod which is bent upon itself as at 14 to form two spaced prongs 15. The free ends of the prongs 15 are preferably pointed and converge towards each other as at 16 and the inner portions of each of the prongs is preferably provided with a flat portion 17 adjacent the free ends as clearly shown in Fig. 2.

Adjacent the bend 14 each of the prongs 15 is provided with an inwardly directed kinked portion 18. The grip 13 is provided with a recess 19 in which the free ends of the prongs 15 are adapted to be positioned.

The device 10 may be used as a handle or holder for either natural sponges or for synthetic sponges such as the rubber sponge 20 shown in the drawings. When it is desired to operatively position a sponge on the handle 10 the shank 12 is removed from the grip 13 and the prongs 15 forced through the sponge up to the bend 14. The prongs are then squeezed together and the free ends thereof inserted in the recess 19 of the grip 13 as shown in Fig. 1. By providing the pointed converging portions 16 on the ends of the prongs 15 they may be more readily inserted in the handle recess 19. When the prongs 15 are positioned in the grip recess 19 the flat portions 17 thereon engage and prevent twisting of the prongs.

When the shank 12 is operatively attached to the grip 13 the prongs 15 taper towards each other from the bend 14 to their free ends which moves the kinks 18 towards each other thereby clamping the sponge therebetween, thus acting to retain the sponge in position on the shank.

The device 10 may be used as a holder for articles other than sponges such as steel wool or the like. When it is used as a holder for steel wool the steel wool is formed into a closely packed spherical mass and then the prongs 15 are forced through this mass and positioned in the handle recess as previously described.

In Fig. 3 I have shown the handle 10 as mounted within a rubber sponge 22. When the sponge is molded on the device the bend 14 is preferably entirely embedded within the body of the sponge. After the sponge 22 has worn to such an extent that it becomes useless it may be torn from the shank 12 and a new sponge positioned thereon as previously explained in connection with Fig. 1.

In Fig. 4 I have indicated generally at 25 a modified form of holder. As shown this holder or handle includes a shank 26 one end of which is positioned in an aperture 27 of a grip 28. At the end of the shank opposite the grip it is bent upon itself to form a loop 29 which is arranged in the plane of the shank and intermediate the length of the loop I preferably provide oppositely extending fingers 30.

Molded around the loop portion 29 of the shank I show a rubber sponge 31 which completely embeds the loop 29 and the fingers 30.

From the foregoing description it will be apparent that I have provided a novel sponge holder which is simple in construction and highly efficient in use.

Having thus described my invention, what I claim is:

1. A sponge and a sponge holder, said sponge holder comprising a shank and a grip, a recess in said grip, one end of said shank being positioned in said recess, the opposite end of said shank being bent upon itself to form a loop, oppositely directed fingers on said loop intermediate the length thereof, said loop and said fingers being completely embedded in said sponge.

2. A sponge holder, said holder comprising a shank and a grip, said shank including resilient material bent upon itself to form two spaced prongs, the ends of said prongs engaging said grip, each of said prongs having an inwardly directed kinked portion adjacent the bend of said shank, said prongs being adapted to be forced through said sponge up to said bend and said kinked portions of said prongs being adapted to clamp a portion of a sponge therebetween.

3. A sponge and a sponge holder, said holder comprising a shank and a grip, said grip including a recess, said shank including a piece of material bent upon itself to form two spaced prongs, the ends of said prongs being positioned in said grip recess, a flattened portion on the inner portion of each of said prongs adjacent the ends thereof, said flattened portions being adapted to engage when said prongs are positioned in said grip recess to prevent twisting of said prongs relative to each other, an inwardly directed kink in each of said prongs adjacent the bend of said shank, said prongs being adapted to be forced through a sponge, said kinked portions of said prongs upon insertion of said prongs into said grip recess moving towards each other thereby clamping a portion of said sponge therebetween.

4. A sponge holder comprising a shank, said shank including a piece of material bent upon itself to form two spaced prongs, said prongs being straight and resilient, the end portion of each of said prongs being bevelled, an inwardly directed arcuate kink in each of said prongs adjacent the bend of said shank, said prongs being adapted to be forced through a sponge, said kinked portions of said prongs being adapted to clamp a portion of a sponge therebetween to hold the sponge in assembled position.

In testimony whereof, I hereunto affix my signature.

GEORGE F. SHIELDS.